United States Patent [19]
Martinelli et al.

[11] Patent Number: 5,599,508
[45] Date of Patent: Feb. 4, 1997

[54] FLUE GAS CONDITIONING FOR THE REMOVAL OF ACID GASES, AIR TOXICS AND TRACE METALS

[75] Inventors: Robert Martinelli, Doylestown; Dennis W. Johnson, Barberton; Robert B. Myers, Copley; Fred C. Owens, II; Peter V. Smith, both of North Canton, all of Ohio

[73] Assignee: The Babcock & Wilcox Company, New Orleans, La.

[21] Appl. No.: 343,285

[22] Filed: Nov. 22, 1994

Related U.S. Application Data

[63] Continuation of Ser. No. 69,639, Jun. 1, 1993, abandoned.

[51] Int. Cl.$^6$ ............................................. B01D 50/00
[52] U.S. Cl. ..................... 422/169; 55/223; 55/257.1; 55/259; 96/53; 422/168; 422/170
[58] Field of Search ........................ 422/168, 169, 422/170; 55/223, 257.1, 259; 96/15, 53; 423/243.01, 243.06, 243.08, 243.11

[56] References Cited

U.S. PATENT DOCUMENTS

| | | | |
|---|---|---|---|
| 3,843,789 | 10/1974 | Spector et al. | 423/243.06 |
| 3,885,929 | 5/1975 | Lyon et al. | 422/169 X |
| 4,019,444 | 4/1977 | Kleeberg et al. | 422/169 X |
| 4,049,399 | 9/1977 | Teller | 55/73 |
| 4,208,383 | 6/1980 | Kisters et al. | 422/169 X |
| 4,296,079 | 10/1981 | Hauser | 423/243.11 |
| 4,305,909 | 12/1981 | Willett et al. | 422/169 |
| 4,366,133 | 12/1982 | Rader et al. | 423/242 |
| 4,670,238 | 6/1987 | Yoon | 423/243.1 |
| 4,861,568 | 8/1989 | Robinson, Jr. | 423/242.5 |
| 5,084,256 | 1/1992 | McElroy et al. | 423/243.08 |
| 5,165,902 | 11/1992 | Bortz et al. | 423/235 |
| 5,220,875 | 6/1993 | Cox | 422/168 X |

*Primary Examiner*—Robert J. Warden
*Assistant Examiner*—Krisanne M. Thornton
*Attorney, Agent, or Firm*—Daniel S. Kalka; Robert J. Edwards

[57] ABSTRACT

A method and apparatus is described for removing acid gases, air toxics and/or other contaminants from a flue gas stream formed during the combustion of fossil fuel, and/or waste materials. The flue gas stream is conditioned immediately downstream of the combustion source with a finely atomized liquid which is preferably water. The water spray decreases the volume of the flue gas and cools the flue gas to condense air toxics or heavy metals on the baghouse fabric filters. Advantageously, this may utilize the alkalinity inherent in the fly ash component of the particulate to assist in the removal of acid gases and/or other contaminants via adsorption. Also, the conditioned gas reduces the flue gas volumetric flow rate and hence the size of the particulate collection device, and the cost of the fabric filter media.

7 Claims, 1 Drawing Sheet

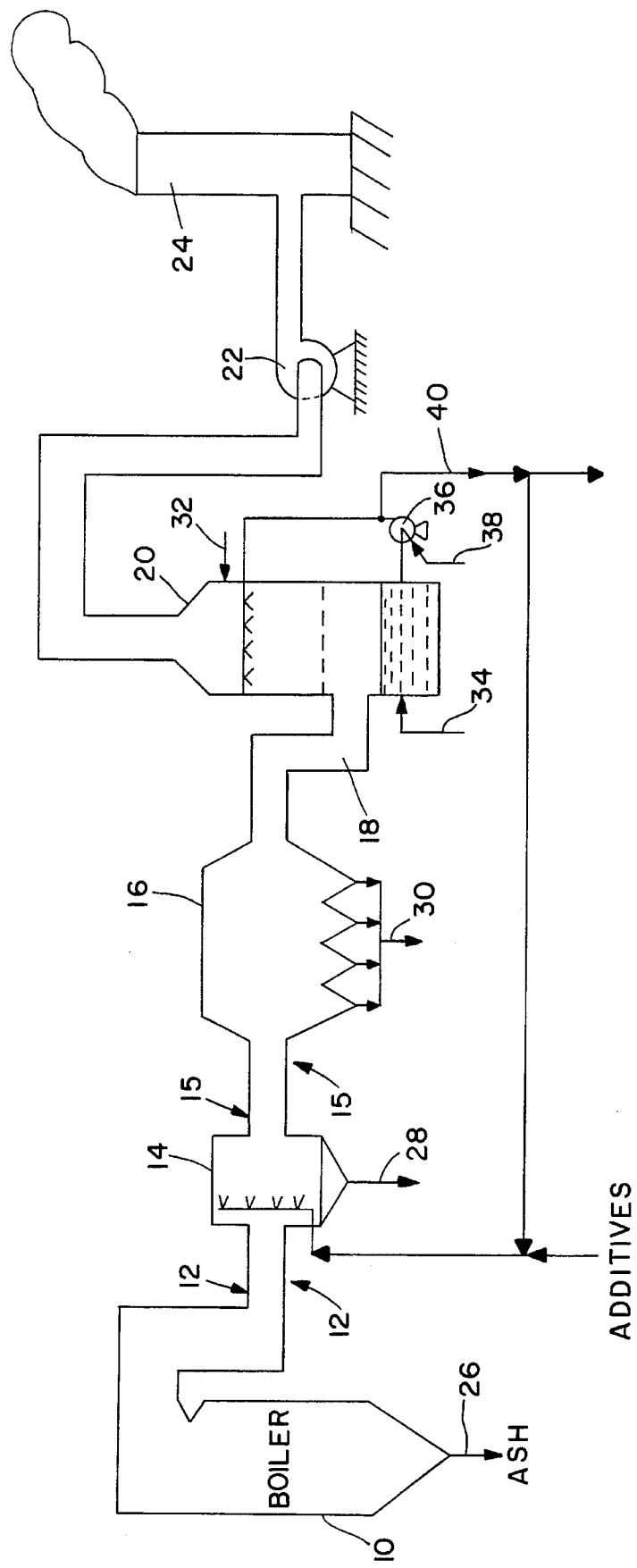
Figure

FLUE GAS CONDITIONING FOR THE REMOVAL OF ACID GASES, AIR TOXICS AND TRACE METALS

This is a continuation of application Ser. No. 08/069,639, filed Jun. 1, 1993, now abandoned.

BACKGROUND OF THE INVENTION

1. Field of the Invention

The present invention relates in general to a method for removing pollutants from a flue gas stream, and in particular, to a method and apparatus for removing acid gases, air toxics and trace metals from a flue gas stream formed during the combustion of waste materials, coals, and other fossil fuels burned in either electric power generating plants, steam generating plants, waste-to-energy plants, or other industrial processes.

2. Description of the Related Art

Removal of pollutant emissions from fossil fuels such as coal, oil, petroleum, coke, orimulsion, etc. and/or waste materials such as municipal waste, tires, etc. is a major concern of electric power generation plants, waste-to-energy plants, and other industrial processes. Prior art attempts to reduce or limit these pollutant emissions have included the following techniques:

1. Locating and utilizing fuels lower in content of sulfur, chlorides, heavy metals and/or other contaminants.
2. Reduction of sulfur content, chloride content, heavy metals content, and/or other contaminants in the fuel by separating various materials from the fuel stream. The major disadvantage with this approach is the cost effectiveness of separation required to achieve the desired levels of reduction.
3. Minimizing the formation of volatile organic/chlorinated organic compounds in the combustion process, by increasing gas temperature and/or gas residence time in the furnace. This approach is not always sufficient to limit the levels of organic or chlorinated organic compounds and other contaminants to the required levels.
4. Spray drying chemical absorption processes, i.e., dry scrubbing, wherein an aqueous alkaline solution or slurry is atomized (via mechanical, dual fluid or rotary atomizers) and sprayed into a hot flue gas to remove sulfur oxides and other contaminants. Additionally, the spray drying process can cause condensation of volatile organic or chlorinated organic compounds and/or heavy metals. These condensed compounds can become attached to solid particles in the flue gas stream and subsequently removed with solid particles in the particulate collector device downstream. The disadvantages with this approach include high pressure losses, significant real estate requirements and capital cost of the dry scrubber vessel.
5. There exist activated carbon technologies which have been used as a method of removing various pollutants, including volatile organic/chlorinated organic compounds and heavy metals from flue gas streams. A typical approach is to inject activated carbon into the flue gas stream prior to a dry scrubber and baghouse. The activated carbon functions as an adsorbent for a variety of pollutants and is subsequently removed from the gas stream in the downstream fabric filter bags of the baghouse. A disadvantage with this approach is the additional capital cost, activated carbon disposal and replacement costs; and operating cost, above the initial investment, and operating cost of the dry scrubber system.
6. Wet chemical absorption processes (i.e., wet scrubbing) wherein the hot gas is typically washed in a countercurrent flow gas/liquid contact device with an aqueous alkaline solution or slurry to remove sulfur oxides and other contaminants. The major disadvantages with this approach are the loss of liquid both to the atmosphere (i.e., due to saturation of the flue gas and mist carry-over) and with the sludge produced in the process, the economics associated with the materials of construction for the absorber module itself, and all related auxiliary equipment downstream (i.e., primary/secondary dewatering and waste water treatment subsystems).

Several examples of patents showing these approaches include U.S. Pat. Nos. 4,696,804; 4,632,810; 4,366,133; 4,623,523; and 4,980,099.

A need remains to improve the removal of pollutant emissions from fossil fuels and waste materials particularly for acid gases including $SO_x$, HCl, and air toxics (volatile organic or volatile chlorinated organic compounds) and trace heavy metals.

SUMMARY OF THE INVENTION

The present invention solves the aforementioned problems with the prior art as well as others by providing a method and apparatus for removing acid gases, air toxics and trace metals from a flue gas. Advantageously, the method and apparatus of the present invention conditions the flue gas with a liquid such as water, a slurry, or water with an additive ahead of particulate collection means. The air toxics in the conditioned flue gas condense on surrounding particulates which are then collected in the particulate collections means. The flue gas is then scrubbed in a scrubbing chamber to remove the acid gases and the cleaned flue gas is then sent to a stack for discharge into the atmosphere.

An object of the present invention is to provide a method and an apparatus for removing acid gases, air toxics, and trace metals from a flue gas stream.

Another object of the present invention is to advance the existing technology for removal of acid gases, air toxics, and trace metals by reducing pollutant emissions with the added reduction in equipment size requirements, improvement in reagent utilization, and producing marketable waste by-products.

The various features of novelty which characterize the invention are pointed out with particularity in the claims annexed to and forming a part of this disclosure. For a better understanding of the invention, its operating advantages attained by its use, reference is made to the accompanying drawings and descriptive matter in which a preferred embodiment of the invention is illustrated.

BRIEF DESCRIPTION OF THE DRAWING

In the drawing:

FIG. 1 is a schematic diagram showing a system used to practice the process of the present invention.

DESCRIPTION OF THE PREFERRED EMBODIMENT

The present invention resides in a method and apparatus for removing acid gases, air toxics such as volatile organic or chlorinated organic compounds and heavy metals, and/or other contaminants such as trace metals from a flue gas stream produced by the combustion of fossil fuels, e.g., coal, oil, petroleum coke, orimulsion, etc., and/or waste materials, e.g., municipal waste, tires, etc. which are burned by power generating plants, waste-to-energy plants, and other industrial processes. The present invention is directed to simultaneously reducing pollutant emissions, reducing particulate collection equipment size requirements, improving reagent utilization, and producing marketable waste by-products.

Referring to FIG. 1, there is shown the preferred embodiment of the present invention which includes a combustion source (10) depicted as a boiler but would also include a fluidized bed, incinerator, etc. followed by a flue gas conditioning means (14) upstream of particulate collection means (16) followed by a scrubbing means (20) and a fan (22) to direct the clean flue gas to a stack (24) for discharge into the atmosphere.

The hot particulate laden flue gas from boiler (10) passes through duct (12) to the flue gas conditioning means (14) which is preferably a humidification chamber. The humidification chamber (14) contains a multiple array of atomizers which may be dual-fluid, mechanical, or rotary type for spraying a homogeneous distribution of a finely atomized liquid into the hot flue gas stream for the purpose of preconditioning the flue gas to aid in the removal of acid gases, air toxics, and trace metals. Of course, the flue gas conditioning means (14) may also consist of a single atomizer in either a humidification chamber (14) or directly in the duct (12) and may consist of an air foil lance apparatus as disclosed in U.S. Pat. No. 4,980,099. Preferably, the flue gas is conditioned with water. However, an alkaline slurry may be employed or even depending on process requirements, additives may be added to the water such as calcium chloride, calcium hydroxide, organosulfides, sodium carbonate, sodium hydrochloride, sodium thiosulfite and magnesium, potassium, calcium and sodium salts, ammonia and ammonia salts, etc. to enhance acid gas removal and/or aid in trace metal collection in the particulate collection device (16) situated immediately downstream.

The latent heat of the flue gas evaporates the atomized liquid droplets which lowers the gas temperature which in turn reduces the flue gas volume and facilitates capture downstream of acid gases, air toxics, and trace metals in the particulate collection means (16). As the flue gas is cooled by water evaporation in the humidification chamber (14), the air toxics including but not limited to volatile organic or chlorinated organic compounds and heavy metals begin to condense and collect on the surface of the surrounding particulates produced by the combustion of the fossil fuel and/or waste material. The temperature of the flue gas exiting the humidification chamber (14) is typically in the range of 150° F. to 280° F.

The purpose of preconditioning the flue gas prior to entering the particulate collection means (16) is three-fold. First, it lowers the bulk flue gas temperature to aid in the condensation of air toxics, for example, the volatile organic or chlorinated organic compounds and heavy metals. Secondly, it utilizes the alkalinity inherent in the flyash component of the particulate collected in the particulate collection means (16) to aid in the removal of acid gases and/or other contaminants via adsorption as the humidified flue gas is filtered by the dust cake deposited on the surface of the fabric filter bags of a baghouse (16) (if the particulate removal means is a baghouse). Also, the reduced temperature may allow for the selection of more economical fabrics. Finally, it reduces the flue gas volumetric flow rate and hence the size of the particulate collection means (16).

An alternate embodiment of the present invention is to add activated carbon or a catalyst to the humidification water for removing additional organic and heavy metal air toxic compounds. The activated carbon or a catalyst would be collected in the bottom of the humidification chamber (14) or particulate collector means (16) where the activated carbon or a catalyst is removed via (28), for separation, regeneration and recycling thereto or disposal via means not shown. The conditioned particulate laden flue gas continues along duct (15) where it next enters the particulate collection means (16). The particulate collection means could be an electrostatic precipitator (ESP), wet electrostatic precipitator (Wet ESP), fabric filter house or baghouse, or any other suitable particulate collection device. Preferably, particulate collection means (16) is a fabric filter house so that as the particulates are deposited on the entrance side of the filter bags, the dust cake deposited on the surface of the fabric filter bags assists in the removal of acid gases due to the inherent alkalinity in the fly ash component. The ash by-product collected in the hoppers of the particulate collection means (16) at (30) may be processed to recover metals or may be utilized as road aggregate material.

The flue gas continues through duct (18) into a scrubbing means which is preferably a wet scrubber chamber (20) though a semi-wet or dry scrubber in an appropriate arrangement could also be used. In the wet scrubber, the gas expands and turns upward into the absorption zone where the gas is further cooled and saturated. The flue gas continues to rise upward through the wet scrubber absorption zone completing the acid gas/other contaminants removal process. As the flue gas leaves the absorption zone, the flue gas continues to rise upwards passing through a mist eliminator section of the absorption tower (20) for the removal of entrained liquid droplets. The cleaned, scrubbed flue gas is then immediately directed by way of fan (22) to the stack (24) where it is subsequently discharged to the atmosphere. Alternately, the fan may be located between the particulate collection device and the scrubber.

The wet scrubber operates in a manner well known in this art. On line (32) fresh water is supplied to the wet scrubber (20). Recycled slurry is supplied to the sump at the bottom of the absorption tower (20) via pump (36). Pump (36) provides the nozzles with slurry from the sump of the absorption tower (20). Fresh sorbent is introduced from line (38). Some of the slurry from the sump is sent by way of line (40) for the production of gypsum or wallboard, or discharge to disposal depending upon the scrubber process. Oxidation air is provided by line (34) for the embodiment shown.

The present invention provides the following advantages over the prior art. First, preconditioning of the flue gas immediately upstream of the particulate collection means facilitates the removal of acid gases, air toxics, and trace metals. Secondly, the optional addition of a calcium, magnesium, potassium or sodium based additive in the preconditioning process will not only aid in the removal of acid gases, but also creates a corrosion resistant protective barrier of reacted/unreacted alkali material on all surfaces in contact with the flue gas. Thirdly, preconditioning the flue gas immediately downstream of the combustion source facilitates particulate collection and reduces the volumetric flow rate which dependent on the combustion source outlet temperature may have a significant effect on reducing the particulate collection device size, and allows the use of low-temperature fabric filters. Finally, the ash by-product collected in the particulate collection device may be processed to recover metals or may be utilized as road aggregate material.

While specific embodiments of the invention have been shown and described in detail to illustrate the application of the principles of the invention, it will be understood that the invention may be embodied otherwise without departing from such principles. One example is for a wet ESP, the temperature entering the particulate collection means (16) could be reduced to saturation.

We claim:

1. An apparatus for removing acid gases, air toxics, and trace metals from a flue gas, comprising:

a combustion source;

a duct connected to said combustion source for supplying a flue gas stream;

a humidification chamber positioned in the duct immediately downstream of said combustion source with at least one atomizer positioned therein for spraying water into the flue gas stream to precondition the flue gas to a temperature of about 150° F. to about 280° F. to condense air toxics on surfaces of particulates contained within the flue gas stream and to decrease a volume of the flue gas, said humidification chamber having a bottom with means for removing some toxic material collected from the flue gas;

a fabric filter house for removing particulates and condensed air toxics from the flue gas stream, said fabric filter house being located downstream from the humidification chamber and connected thereto for receiving the conditioned flue gas stream therefrom; and a wet scrubber situated downstream from said fabric filter house and connected thereto for removing acid gases with a scrubbing medium from the flue gas stream to provide a clean flue gas stream for discharge.

2. An apparatus as recited in claim 1, wherein said humidification chamber includes a multiple array of atomizers.

3. An apparatus as recited in claim 1, wherein said wet scrubber comprises a gas-liquid contact device.

4. An apparatus for removing acid gases, air toxics, and trace metals from a flue gas, consisting essentially of:

a combustion source;

a duct connected to said combustion source for supplying a flue gas stream;

a humidification chamber positioned in the duct immediately downstream of said combustion source with at least one atomizer positioned therein for spraying water into the flue gas stream to precondition the flue gas to a temperature of about 150° F. to about 280° F. to condense air toxics on surfaces of particulates contained within the flue gas stream and to decrease a volume of the flue gas, said humidification chamber having a bottom with means for removing some toxic material collected from the flue gas;

particulate collection means for removing particulates and condensed air toxics from the flue gas stream, said particulate collection means being located downstream from the humidification chamber and connected thereto for receiving the conditioned flue gas stream therefrom; and a wet scrubber situated downstream from said particulate collection means and connected thereto for removing acid gases with a scrubbing medium from the flue gas stream to provide a clean flue gas stream for discharge.

5. An apparatus as recited in claim 4, wherein said humidification chamber includes a multiple array of atomizers.

6. An apparatus for removing acid gases, air toxics, and trace metals from a flue gas, consisting of:

a combustion source;

a duct connected to said combustion source for supplying a flue gas stream;

a humidification chamber positioned in the duct immediately downstream of said combustion source with at least one atomizer positioned therein for spraying water into the flue gas stream to precondition the flue gas to a temperature of about 150° F. to about 280° F. to condense air toxics on surfaces of particulates contained within the flue gas stream and to decrease a volume of the flue gas, said humidification chamber having a bottom with means for removing some toxic material collected from the flue gas;

particulate collection means for removing particulates and condensed air toxics from the flue gas stream, said particulate collection means being located downstream from the humidification chamber and connected thereto for receiving the conditioned flue gas stream therefrom; and a wet scrubber situated downstream from said particulate collection means and connected thereto for removing acid gases with a scrubbing medium from the flue gas stream to provide a clean flue gas stream for discharge.

7. An apparatus as recited in claim 6, wherein said humidification chamber includes a multiple array of atomizers.

* * * * *